(12) United States Patent
Rios

(10) Patent No.: US 9,404,750 B2
(45) Date of Patent: Aug. 2, 2016

(54) HIGH ALTITUDE, LONG ENDURANCE, UNMANNED AIRCRAFT AND METHODS OF OPERATION THEREOF

(75) Inventor: Edward Oscar Rios, Colorado Springs, CO (US)

(73) Assignee: AEROVIRONMENT, INC., Monrovia, CA (US)

(*) Notice: Subject to any disclaimer, the term of this patent is extended or adjusted under 35 U.S.C. 154(b) by 442 days.

(21) Appl. No.: 13/525,045

(22) Filed: Jun. 15, 2012

(65) Prior Publication Data

US 2014/0195150 A1 Jul. 10, 2014

Related U.S. Application Data

(63) Continuation of application No. PCT/US2010/061160, filed on Dec. 17, 2010.

(60) Provisional application No. 61/288,238, filed on Dec. 18, 2009, provisional application No. 61/288,249, filed on Dec. 18, 2009, provisional application No. 61/288,254, filed on Dec. 18, 2009.

(51) Int. Cl.
*G01C 21/00* (2006.01)
*G01S 19/11* (2010.01)
*G01S 19/21* (2010.01)
*B64D 43/00* (2006.01)
*B64C 39/02* (2006.01)
*G05D 1/00* (2006.01)

(52) U.S. Cl.
CPC .............. *G01C 21/00* (2013.01); *B64C 39/024* (2013.01); *B64D 43/00* (2013.01); *G01S 19/11* (2013.01); *G01S 19/21* (2013.01); *G05D 1/0022* (2013.01); *G05D 1/0027* (2013.01); *B64C 2201/122* (2013.01); *B64C 2201/145* (2013.01)

(58) Field of Classification Search
CPC ...... G01C 21/00; B64D 43/00; B64C 39/024; B64C 2201/122; B64C 2201/145; G05D 1/0027; G01S 19/21; G01S 19/11
See application file for complete search history.

(56) References Cited

U.S. PATENT DOCUMENTS

| 4,814,711 | A | * | 3/1989 | Olsen et al. | 324/331 |
| 5,587,904 | A | * | 12/1996 | Ben-Yair et al. | 701/470 |
| 5,886,666 | A | | 3/1999 | Schellenberg et al. | |
| 5,970,506 | A | * | 10/1999 | Kiyan et al. | 715/212 |

(Continued)

OTHER PUBLICATIONS

Tsujii, Toshiaki et al. "A New Positioning/navigation System Based on Pseudolites Installed on High Altitude Platforms Systems (HAPS)", Sep. 3, 2004, XP055071912, ICAS.

(Continued)

*Primary Examiner* — Rami Khatib
*Assistant Examiner* — Jeffrey Boomer
(74) *Attorney, Agent, or Firm* — Brooks Acordia IP Law, P.C.; Eric Aagaard

(57) ABSTRACT

Embodiments include one or more high altitude, long endurance (HALE) unmanned aircraft (110) capable of persistent station-keeping having one or more electromagnetic (IR/Visual/RF) sensor elements or suites (112, 337) for purposes of survey and/or signal gathering. Embodiments include one or more high altitude, long endurance (HALE) unmanned aircraft (110) capable of persistent station-keeping having a directable laser (331). Embodiments include a group of four or more high altitude, long endurance (HALE) unmanned aircraft (611-614) configured as GPS repeaters.

12 Claims, 7 Drawing Sheets

(56) References Cited

U.S. PATENT DOCUMENTS

| | | | |
|---|---|---|---|
| 6,018,659 A * | 1/2000 | Ayyagari et al. | 455/431 |
| 6,084,510 A * | 7/2000 | Lemelson et al. | 340/539.13 |
| 6,300,898 B1 * | 10/2001 | Schneider et al. | 342/357.61 |
| 6,437,727 B2 * | 8/2002 | Lemelson et al. | 342/45 |
| 7,123,169 B2 * | 10/2006 | Farmer et al. | 340/945 |
| 2006/0114324 A1 | 6/2006 | Farmer et al. | |
| 2007/0023570 A1 * | 2/2007 | Bernard | B64C 13/20 244/75.1 |
| 2008/0018545 A1 | 1/2008 | Kaplan et al. | |
| 2008/0284647 A1 | 11/2008 | Oren et al. | |
| 2008/0291079 A1 | 11/2008 | Chang | |
| 2009/0189785 A1 | 7/2009 | Kravitz et al. | |

OTHER PUBLICATIONS 2004 24th International Congress of the Aeronautical Sciences,Retrieved from the Intenet:URL:http://www.icas.org/ICAS_Archive/ICAS2004/Papers/500.pdf [retrieved on Jul. 18, 2013]. Abstract and pp. 1-3.

Tuohino, Jeffrey L. et al.,"Military Pseudolite Flight Test Results",Sep. 22, 2000, XP055071953, ION GPS 2000, Salt Lake City, UT.,Retrieved from the Internet: URL:http://ion.org/publications/pdf.cfm?articleID=1623, [retrieved on Jul. 18, 2013]Supplementary European Search Report for EP Application No. 10838332, mailed Jul. 18, 2013.

International Search Report for PCT/US2010/061160 mailed Feb. 16, 2011.

* cited by examiner

HIGH ALTITUDE, LONG ENDURANCE, UNMANNED AIRCRAFT AND METHODS OF OPERATION THEREOF

CROSS-REFERENCE TO RELATED APPLICATIONS

This application is a continuation of International Application No. PCT/US2010/061160, filed Dec. 17, 2010, and claims priority to and benefit of: U.S. Provisional Patent Application Ser. No. 61/288,238, filed Dec. 18, 2009; U.S. Provisional Patent Application Ser. No. 61/288,249, filed Dec. 18, 2009; and U.S. Provisional Patent Application Ser. No. 61/288,254, filed Dec. 18, 2009; all of which, including appendixes, are hereby incorporated herein by reference in their entirety for all purposes.

TECHNICAL FIELD

The invention, in its several embodiments, pertains generally to aircraft and their component systems, and more particularly to High Altitude, Long Endurance (HALE) unmanned aircraft having high altitude station-keeping capabilities and methods of use of HALE unmanned aircraft.

BACKGROUND

The interaction of space-based communication systems and space-based surveillance systems with terrestrial systems and/or low altitude aircraft may be intentionally degraded by third-party emissions and/or atmospheric effects. For example, a receiver of Global Positioning System (GPS) signals receives relatively weak signals from GPS satellites at known frequencies. Accordingly, the GPS receiver may be subject to signal frequency power jamming by third parties. In addition, the Earth's atmospheric properties limit performance of terrestrially-based space surveillance telescopes with electro-optical and infrared, or radar-based, orbital imaging systems used to view objects in orbit. As a consequence of atmospheric attenuation, and difficulty in obtaining diplomatic clearance for basing space surveillance systems on foreign soil, the domestic entities may be limited in their options to support space operations from surface sites—at ground level or at sea level.

Terrestrially-based space systems are typically limited by geography and/or national boundaries. These Earth-based sites may only see overhead orbits when orbital mechanics cooperate with their terrestrial location. Additionally, Earth-based sites' operations may often be further constrained by available limited infrastructure and long-lead logistical support. The lack of space situational awareness from physically limited, and potentially restricted, terrestrially-based space surveillance systems creates both limitations and vulnerabilities for terrestrial operations that may be highly-dependant on space effects provided by orbital systems.

Satellites may employ powerful digital cameras to image areas of interest on the Earth's surface. Such cameras use various visible and infrared sensors behind large optical systems. Their sensors may be designed to be sensitive to the amounts of light emanating from the area of interest of the Earth's surface. Focused intense light of or within a satellite camera-sensitive spectral band may cause flash blindness and prevent the camera from imaging its intended area of interest. Terrestrial-based source of the intense light are challenged by their physical location relative to a target satellite camera, and are further challenged by atmospheric attenuation.

DISCLOSURE

Disclosed are exemplary methods for, and system embodiments of a plurality of high altitude, long endurance (HALE) unmanned aircraft augmenting communication channels, including global positioning system (GPS) signal augmentation, and exemplary methods for, and system embodiments of a plurality of HALE unmanned aircraft interdicting observations and/or communications of orbital assets, such as satellites. An exemplary HALE aircraft may loiter at 65,000 feet above mean sea level (AMSL), within the stratospheric layer of 55,000 to 70,000 AMSL, and the atmosphere at 65,000 feet and the density may be 7.4% of sea level density. At 65,000 feet there may be only 1.4% as many air molecules to look through versus at sea level. The rarified atmosphere translates to less attenuation of the optics or broadcasted power when compared to terrestrial sensors. The turning radius of a HALE unmanned aircraft may provide for a relatively stationary airborne position for communication relay equipment to rebroadcast the embedded GPS information. An exemplary method of global positioning system (GPS) signal augmentation may comprise: (a) deploying a group of four or more high altitude, long endurance (HALE) unmanned aircraft, each unmanned aircraft comprising a GPS antenna, GPS receiver, and a GPS repeater; (b) receiving, by at least four of the four more HALE unmanned aircraft, a GPS signal from a respective GPS satellite; and (c) forming, by each of the at least four HALE unmanned aircraft respectively, a repeatable received GPS signal for transmission. The exemplary method may further comprise transmitting, by each of at least four HALE unmanned aircraft, the respective, repeatable received GPS signal. Optionally, the exemplary method may further comprise transmitting within a defined geographic boundary, by each of at least four HALE unmanned aircrafts, the repeatable received GPS signal. In addition, the previous embodiments may include the group of four or more HALE unmanned aircraft each flying in one or more station-keeping patterns in a stratospheric layer above a first defined terrestrial region. Also, the method may further comprise relocating, by the group of four or more HALE unmanned aircraft, to fly in one or more station-keeping patterns in a stratospheric layer above a second defined terrestrial region.

An exemplary system embodiment of global positioning system (GPS) signal augmentation may comprise a group of four or more high altitude, long endurance (HALE) unmanned aircraft, each aircraft comprising a GPS antenna, GPS receiver, and a GPS repeater; wherein each HALE unmanned aircraft may be configured to receive a GPS signal from a respective GPS satellite, and form, a repeatable received GPS signal for transmission. In some system embodiment, each of at least four HALE unmanned aircraft may be further configured to transmit, within a defined geographic boundary, the repeatable received GPS signal. In addition, in some embodiments, each HALE unmanned aircraft, of the group of four or more HALE aircraft, is configured to fly in one or more station-keeping patterns in a stratospheric layer above a first defined terrestrial region. In some system embodiments, each HALE unmanned aircraft, of the group of four or more HALE aircrafts, may be configured to relocate and fly in one or more station-keeping patterns in a stratospheric layer above a second defined terrestrial region. Some of the exemplary system embodiments may include each HALE unmanned aircraft being configured to persist at an altitude for two or more twenty-four hour periods, and configured to land for re-supply and/or repair, i.e., aircraft and/or onboard component repair; and thereafter return to a stratospheric layer.

Embodiments include communication interdiction and/or passive surveillance interdiction. For example, a method of satellite sensor interdiction may comprise: (a) deploying a first high altitude, long endurance (HALE) unmanned aircraft comprising a satellite tracker and a directable electromagnetic (EM) radiation emitter in cooperation with the satellite tracker; (b) acquiring, by the satellite tracker, a satellite having an onboard EM sensor; (c) tracking, by the satellite tracker, the acquired satellite; and (d) emitting interdicting EM radiation, by the directable EM radiation emitter, to the tracked satellite. The exemplary method may further comprise, prior to the step of emitting by the first HALE unmanned aircraft: (a) deploying a second HALE unmanned aircraft comprising a satellite tracker; (b) signaling by the first HALE unmanned aircraft to the second HALE unmanned aircraft, the location of the tracked satellite; (c) acquiring, by the satellite tracker of the second HALE unmanned aircraft, the satellite tracked by the first HALE unmanned aircraft; and (d) tracking, by the satellite tracker of the second HALE unmanned aircraft, the satellite tracked by the first HALE unmanned aircraft. The method may further comprise the second HALE unmanned aircraft transmitting, by the second HALE unmanned aircraft, an interdiction assessment to the first HALE unmanned aircraft. Optionally, the second HALE unmanned aircraft of the exemplary method may further comprise a directable electromagnetic (EM) radiation emitter that is in cooperation with a satellite tracker of the second HALE unmanned aircraft. The method may further comprise emitting interdicting EM radiation, by the directable EM radiation emitter of the second HALE unmanned aircraft, to the tracked satellite based on an interdiction assessment of at least one of: the first HALE unmanned aircraft and the second HALE unmanned aircraft. For some embodiments, the directable EM radiation emitter of the first HALE unmanned aircraft of the exemplary method may comprise a turret-mounted laser. In some embodiments, the satellite tracker of the first HALE unmanned aircraft may comprise a gyroscopically stabilized telescopic platform feeding an electro-optical sensor in communication with a tracking processor.

System embodiments of satellite sensor interdiction may comprise a first high altitude, long endurance (HALE) unmanned aircraft that comprises a satellite tracker and a directable electromagnetic (EM) radiation emitter in cooperation with the satellite tracker wherein the satellite tracker that may be configured to acquire and track a satellite having an onboard EM sensor; and where the directable EM radiation emitter may be configured to emit interdicting EM radiation to the EM sensor of the tracked satellite. The system embodiment may further comprise a second HALE unmanned aircraft that may comprise a satellite tracker, wherein the second HALE unmanned aircraft may be configured to receive, via signaling by the first HALE unmanned aircraft or via signaling via a ground station, the location of the tracked satellite; where the satellite tracker of the second HALE unmanned aircraft may be configured to acquire the satellite tracked by the first HALE unmanned aircraft; and where the satellite tracker of the second HALE unmanned aircraft may be further configured to track the satellite tracked by the first HALE unmanned aircraft. The second HALE unmanned aircraft of some system embodiments may further be configured to transmit an interdiction assessment to the first HALE unmanned aircraft. The second HALE unmanned aircraft of some embodiments may further comprise a directable electromagnetic (EM) radiation emitter in cooperation with a satellite tracker of the second HALE unmanned aircraft. The directable EM radiation emitter of the second HALE unmanned aircraft of some system embodiments may be further configured to emit interdicting EM radiation to the tracked satellite based on an interdiction assessment of the first HALE unmanned aircraft and/or the second HALE unmanned aircraft. For some system embodiments, the directable EM radiation emitter of the first HALE unmanned aircraft of some system embodiments may comprise a turret mounted laser. The satellite tracker of the first HALE unmanned aircraft of some system embodiments may comprise a gyroscopically stabilized telescopic platform feeding an electro-optical sensor in communication with a tracking processor.

BEST MODES

Figure 1:
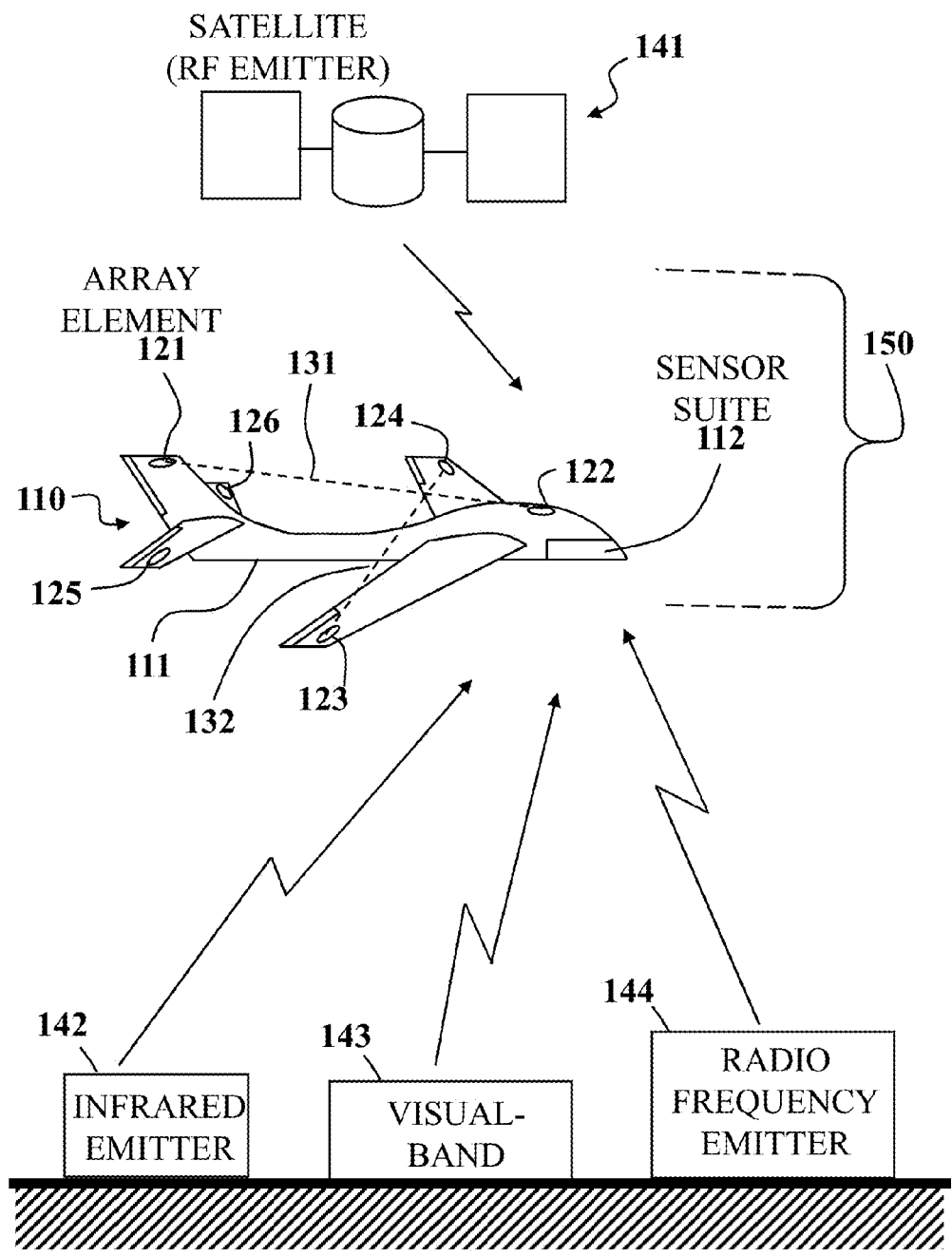
FIG. 1 depicts a high altitude, long endurance (HALE) unmanned aircraft interposed in the stratosphere between a satellite emitter and terrestrial emitters.

FIG. 1 depicts a high altitude, long endurance (HALE) unmanned aircraft 110 comprising a fuselage 111 having an outer skin. The fuselage houses a communication suite and may have one or more forward electromagnetic (IR/Visual/RF) sensor suites 112. An electromagnetic radiation sensor array comprising a plurality of sensor elements 121-126 are depicted as disposed about the outer skin of the fuselage 111, where the disposition of the forward sensor element 122 and the tail sensor element 121 define a longitudinal sensor array baseline 131. Also depicted are starboard wingtip sensor element 123 and port wingtip sensor element 124 defining a transverse sensor array baseline 132. Accordingly, the HALE unmanned aircraft is depicted as configured to receive and process signal intelligence from exemplary assets such as a satellite radio frequency (RF) emitter 141, a terrestrial infrared emitter 142, a terrestrial visual band emitter 143, and a terrestrial RF emitter 144, and the HALE may do so while flying in a stratospheric layer 150 for a plurality of twenty-four hours periods.

Sensors may be mounted on top of the HALE aircraft platform, as well as, inside the wings. A HALE aircraft may include wings of substantial span where such long wings may be largely hollow, and a HALE may include a long tail boom. The geometry and distances provided by the HALE aircraft may make it an ideal near space asset for electromagnetic signal collection by disposing sensors along and/or at the distal portions of the wings and/or tail boom. In addition, the HALE aircraft may remain at altitude in an almost stationary flight pattern, i.e., from the perspective of a ground observer, over a terrestrial region for days to provide real-time persistent signal mapping.

The receiving and processing of third-party signal emissions, and the mapping of the electromagnetic spectrum impinging on the HALE aircraft sensor suite, may be augmented with sensors disposed under the HALE aircraft platform in addition to those sensors disposed on top of the aircraft. In combination with other similarly configured HALE aircraft or other signal collection assets, a thorough understanding of the signals environment, to include the detection of jamming or analysis or other broadcasts, may be possible to support space and terrestrial operations. So, just as time-of-arrival analysis may be used between wingtip disposed sensors, time-of-arrival or other form of analysis may be used between sensors disposed across a constellation of similarly configured HALE aircraft.

Figure 2:
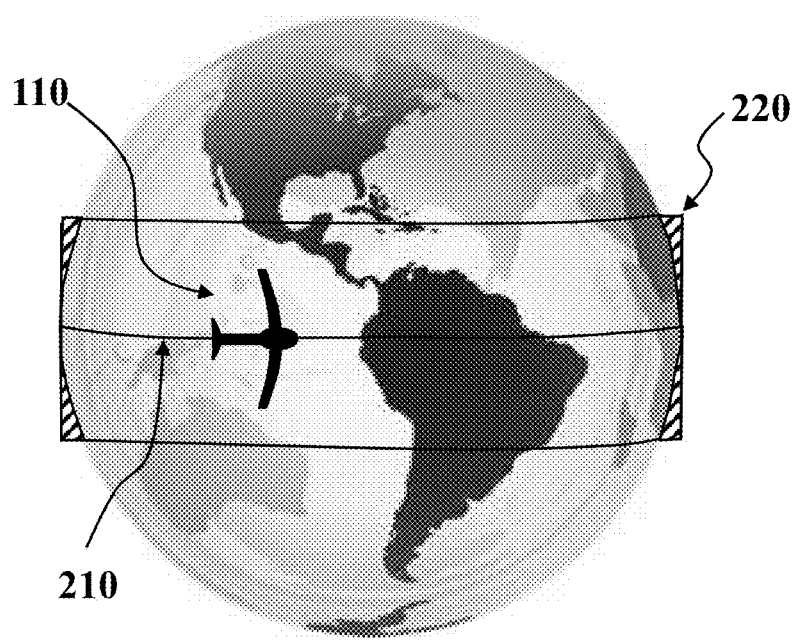
FIG. 2 depicts a HALE unmanned aircraft at the equator and its earthward field of view.

Space situational awareness, communication signal augmentation, and/or communication interdiction may be enhanced by the positioning of one or more HALE aircraft embodiments. The HALE aircraft embodiments may be repositioned in a constellation of station keeping flight patterns at stratospheric conditions, for example, at 65,000 ft. above sea level, and/or within a range of 55,000-70,000 ft. above sea level, and in some embodiments to 100,000 ft. and thereby provide global persistence over a wide area with multiple platforms. At stratospheric conditions, the HALE aircraft embodiments are above weather conditions, and may be largely insensitive to day-night variations during an operation. Reference is made to U.S. Pat. No. 7,281,681, which issued Oct. 16, 2007, to MacCready et al., titled "Hydrogen Powered Aircraft," and to U.S. Pat. No. 6,913,247, which issued Aug. 16, 2005, to Cox et al., titled "Aircraft Control Method," both of which are incorporated herein by reference. Reference is also made to U.S. Pat. No. 6,944,450, which issued Sep. 13, 2005, to Cox, titled "Communication System," and to U.S. Pat. No. 7,198,225, which issued Apr. 3, 2007, to Lisoski et al., titled "Aircraft Control System," both of which are incorporated herein by reference. As a stratospheric persistence surveillance platform, a HALE unmanned aircraft may be positioned in geostationary station-keeping, and may be relocated. FIG. 2 depicts a HALE unmanned aircraft (not to scale) over the equator 210 that, by its stratospheric location, can support the acquisition of satellites above 100 miles having angles of inclination less than 17 degrees 220. A HALE aircraft may land to refuel, swap or update equipments, or temporarily stand down for equipment repair, and then be returned to stratospheric station-keeping. A HALE may be redirected to a different geostationary position while at altitude. A HALE aircraft may comprise substantial wingspan relative to fuselage width, and/or substantial tail boom length relative to fuselage width. Accordingly, sensors may be disposed at an outboard position with sufficient separation to support optical three-dimensional view or assessment of the effects of jamming and/or dazzling of satellites by the instant HALE aircraft or another member of a HALE constellation. The three-dimensional viewing may also support identification and assessment unidentified space assets proximate to friendly space assets. Reference is made to U.S. Pat. No. 7,802,756, which issued Sep. 28, 2010, to Kendall et al., titled "Aircraft Control System," and to U.S. Pat. No. 6,550,717, which issued Apr. 22, 2003 to MacCready et al., titled "Liquid Hydrogen Stratospheric Aircraft," both of which are incorporated herein by reference.

Figure 3:
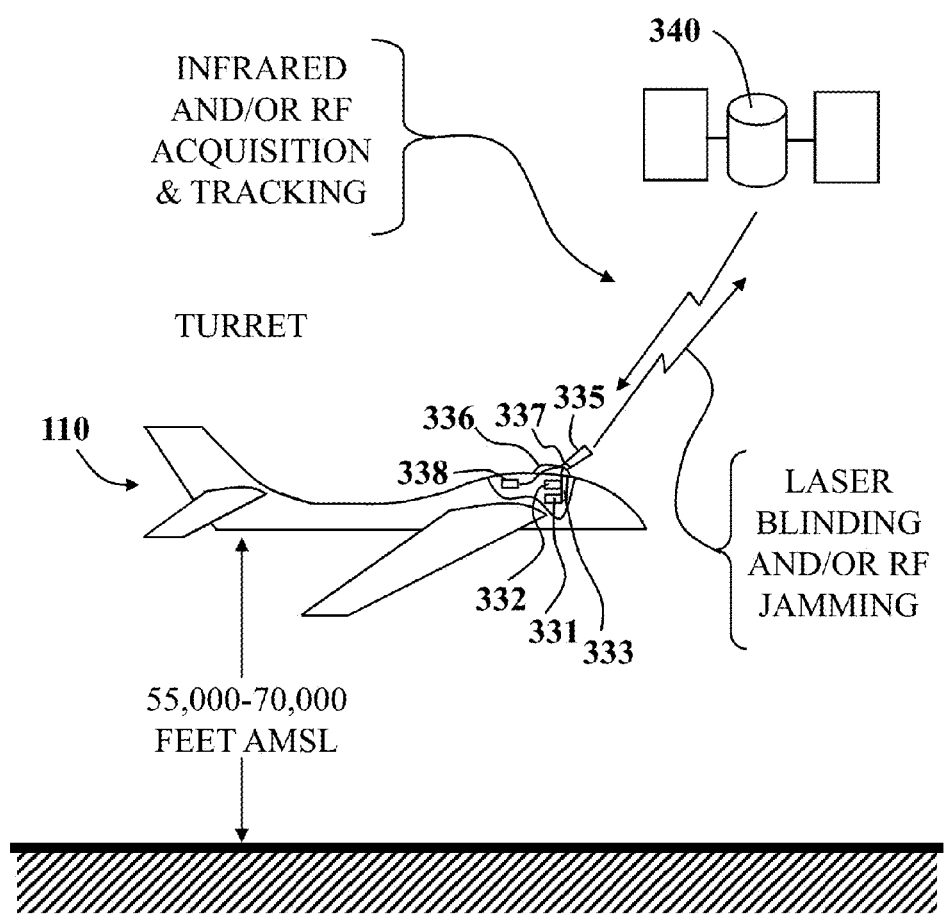
FIG. 3 depicts a HALE unmanned aircraft configured to track a satellite and/or interdict a satellite sensor.

Situation awareness may be improved by an operator directing the HALE aircraft over large bodies of water, such as international sea lanes and other ocean areas, where space situational awareness may be achieved via telescopes and electro-optical and infrared orbital imaging sensors or radar, and associated equipment, integrated on top of and/or into one or more HALE aircraft platforms. For example, space surveillance in support of space situational awareness may use electro-optic/infrared (EO/IR) sensors, and/or radar frequency (RF) sensors, mounted on top of a HALE aircraft fuselage. That is, the exemplary sensors may be oriented to look into space at satellites and space surveillance in support of space situational awareness using signal detection equipment mounted on the top, and/or on the bottom, of a HALE aircraft for electromagnetic spectrum mapping or the processing of received third-party signals, e.g., signal intelligence processing. FIG. 3 depicts a HALE unmanned aircraft 110 showing in a cutaway a plurality of lasers 331,332 of differing wavelengths, an optical combiner 333 that feeds the laser light to a gyroscopically stabilized telescope 335, and the telescope may be mounted on a two-axis turret 336. FIG. 3 also depicts an EO/IR sensor 337 in cooperation with a tracker processor 338. Accordingly, the HALE unmanned aircraft may observe a satellite 340, and/or blind or dazzle a satellite sensor, and/or jam the communication reception of the satellite 340.

The space surveillance mission in support of space situational awareness involves surveilling space by looking up into space with sensors from a persistent, i.e., substantially geo-stationary, HALE aircraft. An objective may be to track and understand the friendly asset's order of battle and the potentially hostile asset's order of battle—from the moment of launch, for example. Presently available electro-optical, infrared, and radar sensors, looking at Earth, i.e., oriented to receive input from Earth, may be detecting against a more cluttered and changing surface than the orientation of looking up at space presents. Accordingly, exemplary turrets housing sensors may be mounted on a turret of a HALE aircraft, and each turret may be customizable with existing sensors that allow them to look up against cold space with infrared, low-light and electro-optical sensors, and see a satellite with minimal or no distortion by the atmosphere. Accordingly, synthetic-aperture radar (SAR) payloads may comprise the sensor suite of an exemplary HALE aircraft.

Accordingly, while FIG. 3 depicts a single HALE unmanned aircraft, two or more HALE unmanned aircraft may be used to jam communications satellites where the HALE aircraft may have aimed, or directed, radio frequency jamming systems emitting into space, and/or using a directed laser to blind a third-party optical receiver, i.e., to blind or dazzle low-earth orbit imaging satellites using a HALE aircraft and directed laser systems emitting into space. A laser or a bank of lasers of appropriate wavelengths to match that sensitive spectral band or the satellite sensors, and an optical output power may be mounted within the HALE aircraft platform, e.g., within or proximate to a turret housing. To perform the dazzling or blinding mission, an exemplary HALE aircraft may be configured with an EO/IR sensor, e.g., the L3-Sonoma 494 or Raytheon MTS-B turret or other radar arrays used in high-performance terrestrial and aircraft systems. The laser beams from these may be combined by an optical system, the output of which may be fiber optic coupled to a telescope. Some of the telescope embodiments may be similar to what may be an EO/IR sensor turret modified to project the multi-spectral laser beam toward the target satellite. The telescope system may also comprise an imaging sensor that may be used to track the target satellite and to assure that the projected laser beam irradiates the target. Additional HALE aircraft may be used to provide additional perspectives from with jamming, including RF jamming via a directed RF power transmitter, and or dazzling may be effected, and one or more additional HALE aircraft may be used to observe the effects on the target of the jamming and/or dazzling.

Typically, modern communications satellites carry multiple Ku-band transponders employing traveling-wave-tube amplifiers (TWTAs) to provide an Effective Isotropic Radiated Power (EIRP) of 50-60 dBW at the edge of coverage polygon. Additionally, C-band transponders employing TWTA to provide an EIRP of 39 dBW at the edge of coverage. Depending on power and antenna gain, a transmitter that broadcasts a HALE aircraft platform in a near-space altitude of 65,000, within the Equivalent Isotropic Radiated Power (EIRP) of a geostationary communications satellite will interfere with, or potentially obscure, the signal originating from the satellite as received by the intended ground station.

Current satellite ephemeris data for a target satellite may be available and/or data from other sources, such as remote terrestrial stations, may provide inter-range vectoring to the HALE aircraft platform, particularly the sensor suite, for target acquisition to determine location and orientations for possible EO/IR or radar imaging of a satellite. The tracking sensor on the HALE aircraft platform may be radar or high resolution visual such as HDTV resolution or better in all wavelengths. The HALE aircraft may be on station and the line-of-sight (LOS) between the sensor and the satellite may be within 45 degrees of nadir.

Exemplary acquisition process: The HALE aircraft platform sensor may be pointed at coordinates calculated from target satellite ephemeris data—the ephemeris data may resolve to about 1/10th of a degree in azimuth and elevation-well within the capability of the sensor. Once sighted, the system may engage a video tracking algorithm by pointing the aperture so as to center the target within the optimal jamming transmission beam. The system may thereafter point/direct the jamming device aperture so as to center the target within the sensor field of view, track and increase power so as to improve desired jamming. The sensor may be pointed at coordinates calculated from target satellite ephemeris data because the ephemeris data is typically expected to resolve to about 1/10th of a degree in azimuth and elevation—a value expected to be well within the capability of the sensors selected for embodiments. If the target satellite is not within the initial field of view, the sensor may perform a spiral search scan of the area around the initial pointing direction until the target is sighted. The sensor suite may then engage a video tracking algorithm by pointing the turret so as to center the target, i.e. put the curser on target, within the sensor field of view, e.g., at a middle pixel both horizontal and vertical. The sensor suite of the turret may then be pointed/directed/oriented so as to maintain the center of the target within the sensor field of view, track and increase zoom or focal length so as to improve tracking accuracy.

Exemplary sensors may include currently available electro optical and infrared sensors designed with turret applications such as the Raytheon MTS or Sonoma 494 turrets. Additionally, radar sensors on top of HALE aircraft could include SAR, GMTI or AESA type arrays available to provide metric and/or imaging data on satellites. These sensors could be mounted on, or integrated into, the HALE aircraft wings or tail boom as well as the fuselage with associated equipment within the aircraft payload bays. Sensors such as antennas, arrays, directional algorithms and equipment currently used on other aircraft or satellites may be mounted on, or integrated into, the HALE aircraft wings or tail boom as well as the fuselage with associated equipment within the aircraft payload bays.

A rack of related transmitting equipment, combined with available tri-band antenna mounted on top of a HALE aircraft provides enough power and gain to deny, degrade and disrupt a satellite communications signal with less atmospheric impedance and signal propagation because of the remaining small amount of atmosphere above an orbiting HALE aircraft at 65,000 feet, or within a range of 55,000 to 70,000 feet above sea level.

Current satellite ephemeris data for the target satellite may be to provide inter-range vectoring to the HALE aircraft sensor for target acquisition. The HALE aircraft may be on station and the line-of-sight (LOS) between the sensor and the satellite may be within the EIRP of the COMSAT.

As a HALE-mounted laser beam travels farther from its source, it diverges, and as it diverges, its energy may be spread over a larger area. In addition, the beam may be attenuated as it passes through what atmosphere may be present. Once a laser beam reaches the satellites detectors, the satellite camera optics gathers all of the light falling on the objective lens and focuses it onto the surface of the image sensor. This intensifies the laser irradiance at the surface of the sensor.

Digital image sensors that may be used by orbital targets may include complementary metal-oxide semiconductor (CMOS) and charge-coupled device (CCD) sensors, and various arrays or stacks thereof. These sensors have small light sensitive areas called pixels, which measure the radiant energy falling on them. The amount of radiant energy falling on each pixel may be proportional to the area of the pixel itself. Typical sizes range from over 20 microns to under 5 microns. For discussion in this example a pixel size of 9 microns square may be assumed. So, if there is 0.43 mw of laser radiance per sq. cm. at the sensor, and the sensor is 20 mm square and the pixels may be 9 microns square then there are 2222 pixels across the width and height of the sensor (about 5 megapixels) and there are 0.3496 nanowatts of laser energy falling on each pixel, for example. In other words, the satellite CCD (camera) would be blinded. One may conservatively presume a quantum efficiency of 21% at the wavelength of the laser radiation. So, for example, a 600 nanometer wavelength (visible red) laser, may be near the peak sensitivity of the red pixels of common CCD sensors. Then we may calculate the energy per photon as: $Ep=h \cdot \lambda/c$, where h is Planck's constant and $\lambda/c$ is the laser light frequency from wavelength divided by the speed of light. Solving for 600 nm gives 3.3093-19 joules per photon. Therefore, for a continuous-wave laser source, there would be about 1 trillion photons per second per pixel. Further assuming a 1 millisecond integration time, which is analogous to shutter or exposure time on a film camera, for a CCD sensor with 21% quantum efficiency, there would be 221,834 electrons of charge on a pixel. Typical CCD sensors saturate at 100,000 electrons per pixel. Therefore, in this example, the satellite camera would be blinded on all red pixels (i.e., exceedingly overexposed).

However, satellite cameras may have sensors covering the full spectrum of visible and several infrared bands. Sensors sensitive in various IR bands have similar plots which peak in their respective bands. To fully blind a visible CCD sensor it may be necessary to combine the light from red, green and blue lasers. Reasonable wavelengths would be 450 nm, 530 nm and 600 nm, respectively. Additional lasers with appropriate IR wavelength could also be added. Lasers of these wavelengths and in the power ranges of interest may be existing technology and may be integrated into a HALE aircraft platform.

Figure 4:
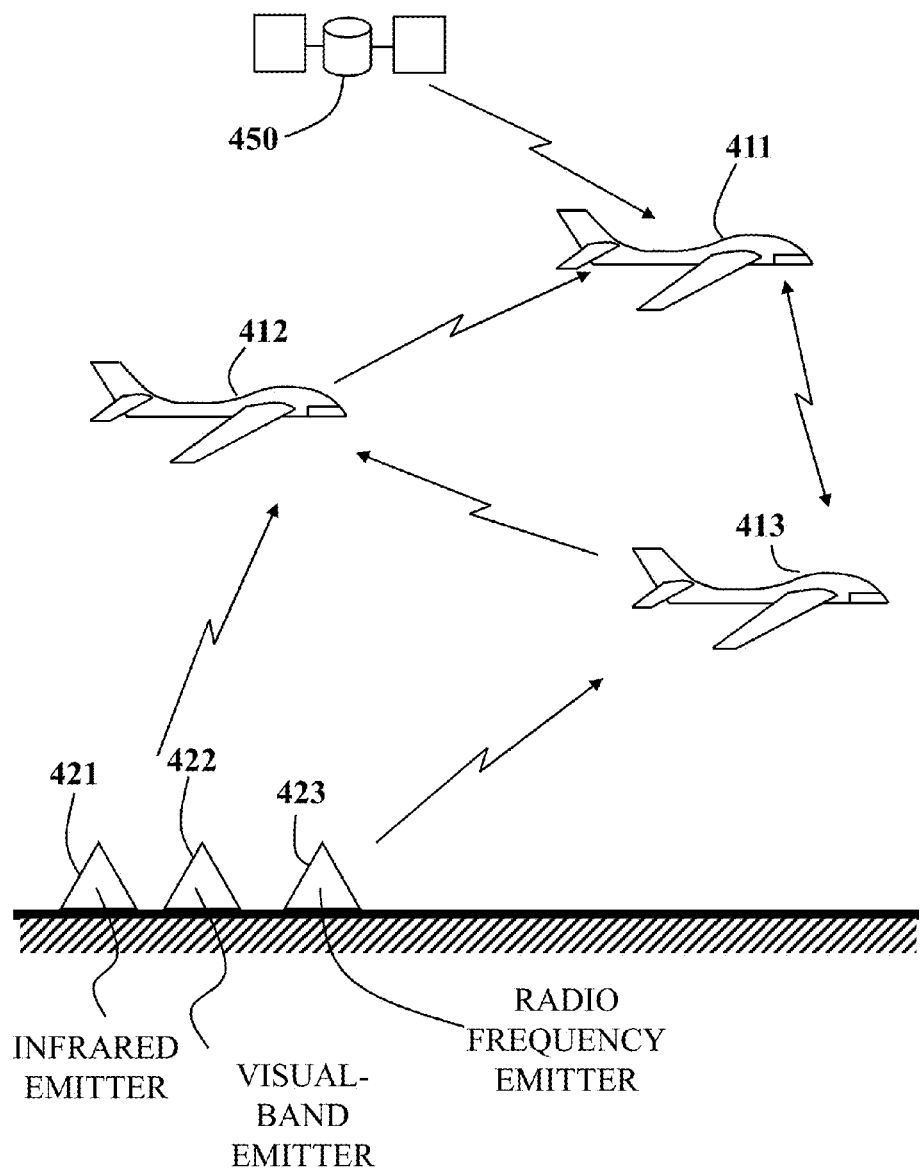
FIG. 4 depicts a group of HALE unmanned aircraft interposed in the stratosphere between a satellite emitter and terrestrial emitters.

The HALE aircraft position accuracy may be determined through a Global Positioning Satellite (GPS), and an inertial package, and, if required, star-tracking, where the choice, quantity, and quality of instruments may vary depending on acceptable system signal senescence, and other performance parameters. The power and type of jamming may be driven by the target satellite transponder, channels, signal polarization and transmitting power in order to ensure targeting and jamming efficiency with counter-communications equipment integrated into the HALE aircraft. FIG. 4 depicts a group of three HALE unmanned aircraft 411-413, each in communication with one another, where the group flies in station-keeping patterns in the stratospheric level, and is collectively within the beam width of a terrestrial emitter, such as an infrared emitter 421, a visual band emitter 422, and/or an RF emitter 423. Also depicted in FIG. 4 is at least one HALE unmanned aircraft 411 of the group in communication with a satellite 450. One or more of the terrestrial emitters may be a satellite tracking station using inter-range vectors (IRVs) for observing, and so their transmissions may comprise IRV data that may be used to support inter-range vectoring.

A HALE aircraft may loiter within its maximum altitude envelope over an area of interest that may be experiencing GPS jamming. The HALE aircrafts may be configured to operate as an airborne pseudo-satellites (or "pseudolites") that provide high power GPS signals to overpower jammers. Accordingly a wing of HALE aircraft, each configured as part of a pseudolite system may function as a lower-orbiting subset of a GPS satellite constellation. For example, four pseudolites may be required for a full navigation solution, just like four GPS satellites may be required today. The exemplary HALE airborne pseudolites may first determine/find each of their own positions from GPS satellites, even in the presence of jamming. This may be accomplished due to their high altitude—away from terrestrial-base jammers, and/or via a beam forming antenna and a signal processor that decrease the effects of jamming. The HALE constellation may then transmit a GPS-like signal (rebroadcast) to the ground at much higher power and at closer range than the satellites can accomplish. This signal accordingly overwhelms the jammer and allows the multitude of users to overcome the jamming and continue to navigate.

Combining this HALE UAV performance with currently fielded Ku-band software defined radio systems and associated routers has the direct capability of transmitting several secure links of data ranging from 10.71 Mbps to 45 Mbps. 274 Mbps technology may be within a year of fielding with the same hardware SWAP as current capability. Similarly, cell phone technology, VHF and other terrestrial support radio, cell phone and other communication systems used by police, fire and other crisis first responders require contingency capability in the event terrestrial systems may be inoperable during a crisis. Once compatible electronics may be hosted on a HALE aircraft, the platform may act as a communications relay and broadcast source for first responders as a pseudolite platform or cell tower.

A HALE aircraft may be configured to receive and process GPS signals with or without the aid of an onboard star tracker. Once the GPS signal is received by the one or more radio receivers of the HALE aircraft, the signals may be translated into the Ku waveform, may be embedded in existing data communication links, and rebroadcast to receivers integrated into other platforms, and thus circumventing the GPS-tuned jamming environment without experiencing interference.

Figure 5:
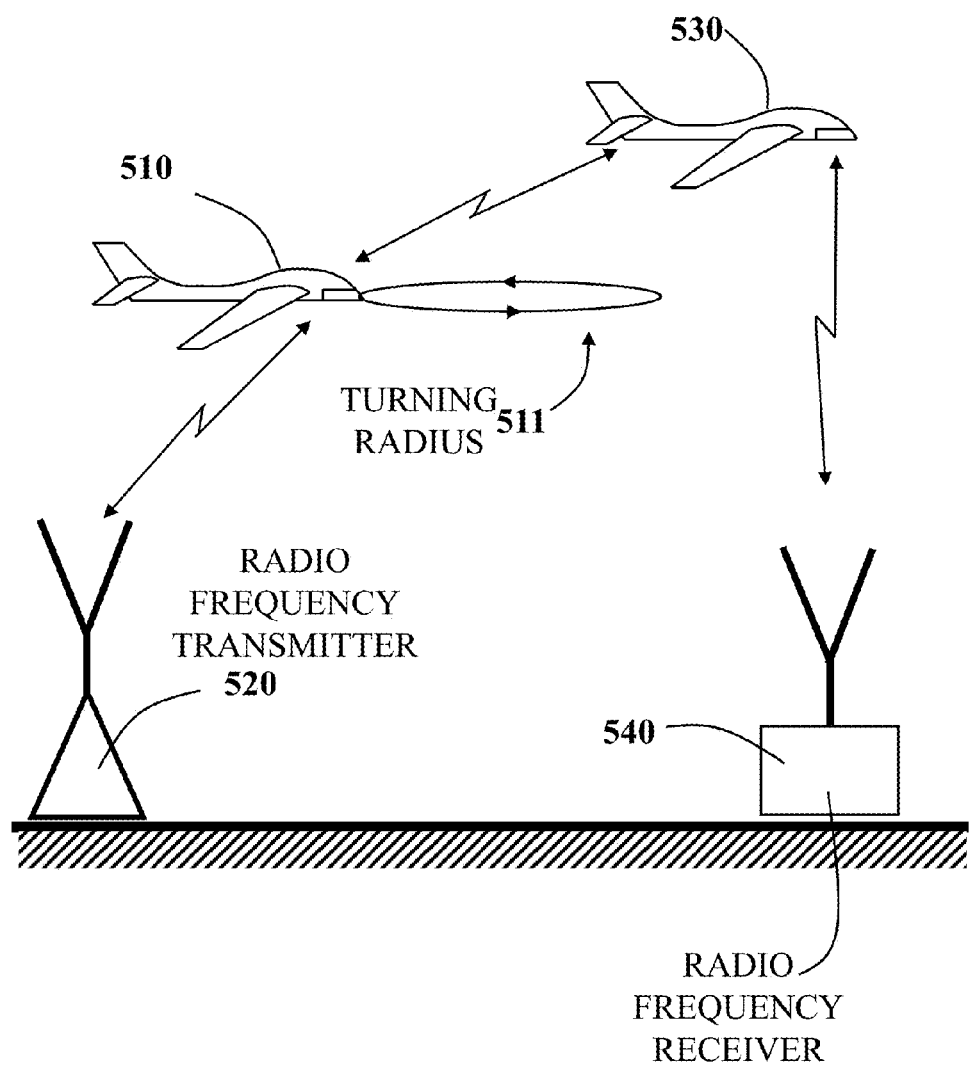
FIG. 5 depicts two HALE unmanned aircraft relaying communication from a terrestrial RF transmitter and a terrestrial RF receiver.

Two or more HALE unmanned aircraft may augment or locally replace satellite communications in the face of jamming and/or disablement of communication satellites. For example, FIG. 5 depicts a first HALE unmanned aircraft 510 positioned, via a station-keeping pattern 511, at altitude of 55,000-70,000 feet above mean sea level, and within the beam width of a terrestrial RF transmitter 520. The first HALE unmanned aircraft 510 is depicted as receiving the transmissions of the terrestrial RF transmitter 520, and relaying or otherwise transmitting the communications to a second HALE unmanned aircraft 530. The second HALE unmanned aircraft 530 may be configured to relay the communications to additional HALE unmanned aircraft, or, as is depicted in FIG. 5, to transmit the communication to a terrestrial RF receiver 540.

Figure 6:
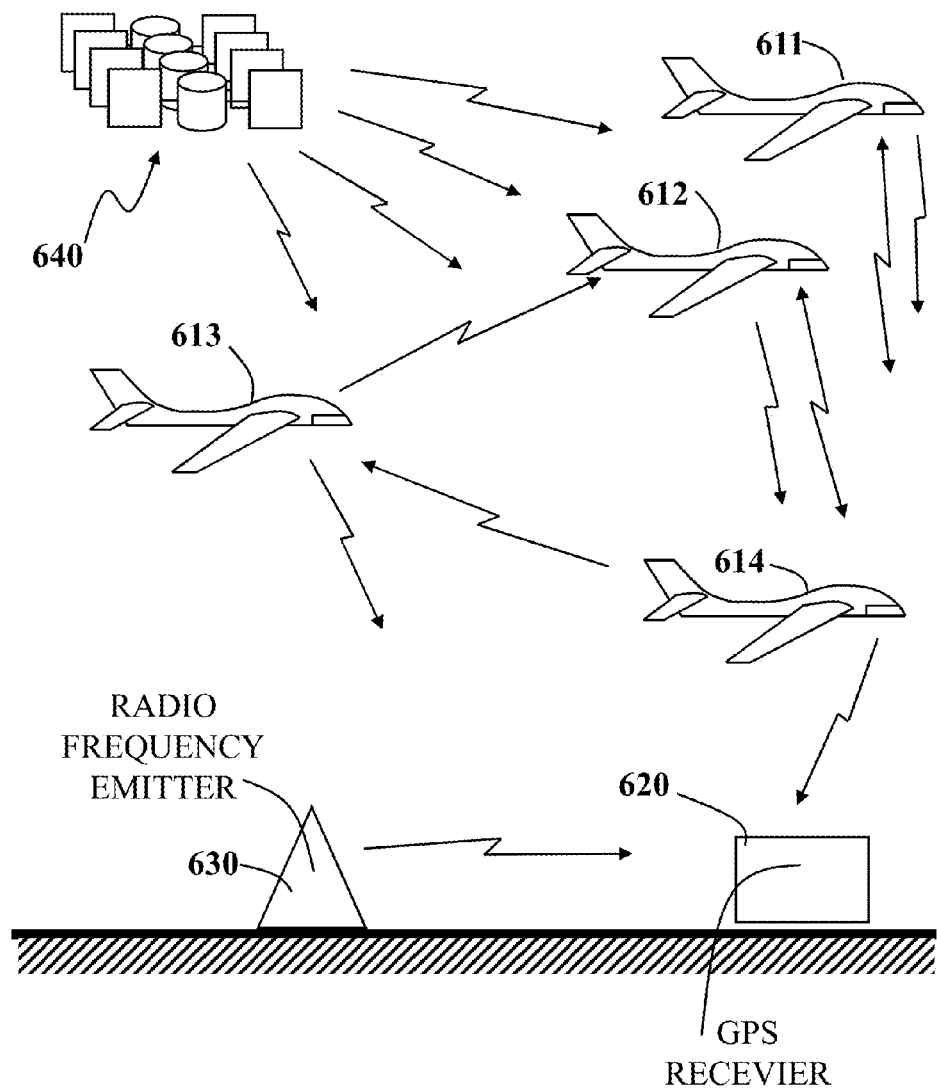
FIG. 6 depicts a group of HALE unmanned aircraft configured to repeat GPS signals for a terrestrial receiver in the face of an interring terrestrial RF emitter.

FIG. 6 depicts a group of four HALE unmanned aircraft 611-614 in a set of geostationary flight patterns within the stratospheric layer and within the beam width of a terrestrial GPS receiver 620. A terrestrial RF emitter 630 is depicted as interring and/or actively jamming the GPS signals for the exemplary GPS constellation 640. Augmentation of precision navigation and timing of Global Positioning System (GPS) signals received by a HALE-based receiver may be effected by routing signals through software-defined radios mounted within the fuselage of a HALE aircraft for signal assurance in a jammed environment. Accordingly, augmentation of precision navigation and timing of the Global Positioning System signals may be effected by re-broadcasting GPS satellite RF signal to terrestrial and airborne receivers from GPS repeater electronics onboard the HALE aircraft. The HALE aircraft may be configured with surrogate communications satellite capability, for reconstitution of an airborne communication node, to augment terrestrial communication degradation and/or satellite communication (SATCOM) signal degradation or absence.

Figure 7:
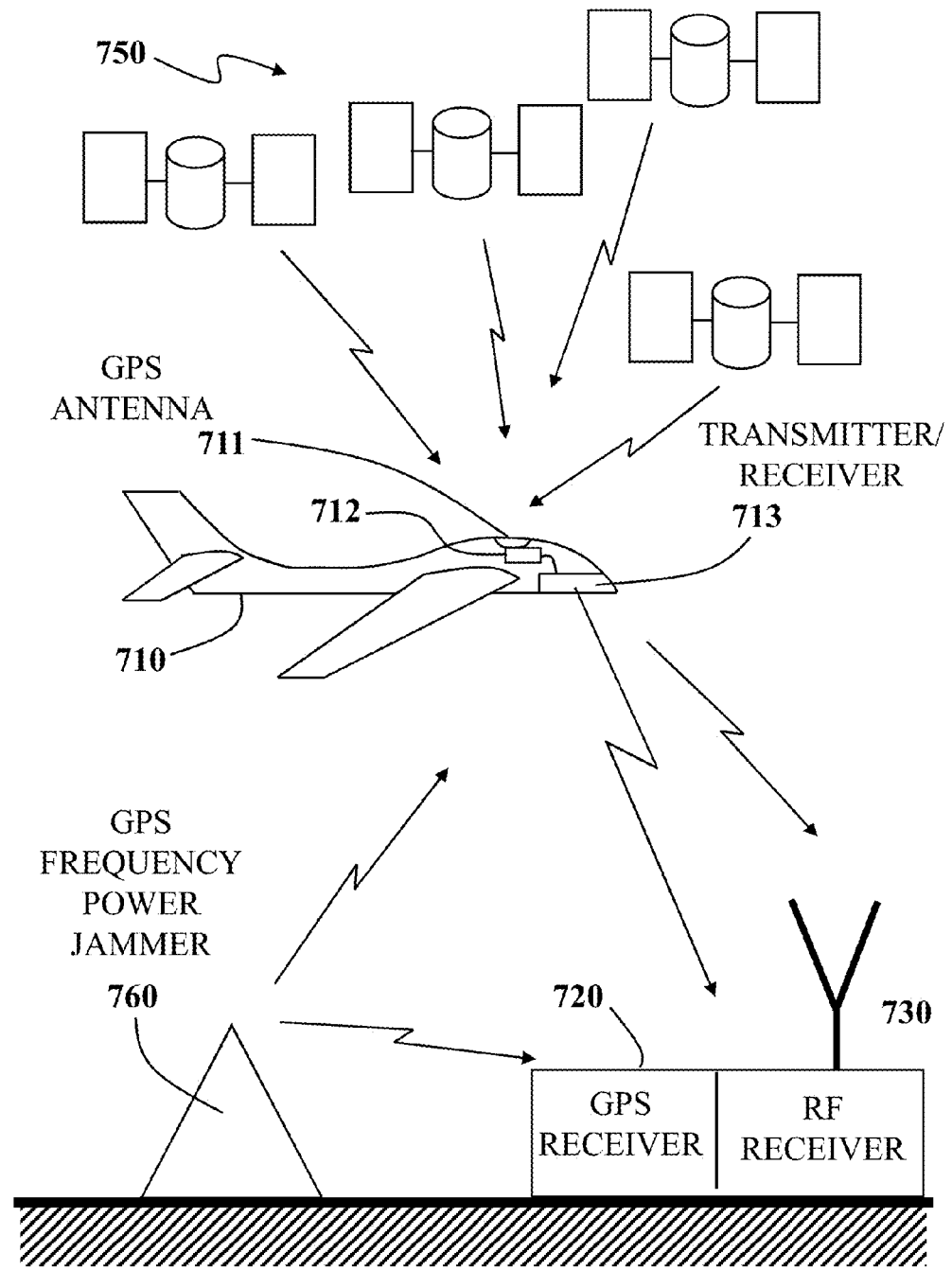
FIG. 7 depicts a member of a group of HALE unmanned aircraft configured to repeat or augment GPS signals for a terrestrial receiver in the face of an GPS power jammer.

FIG. 7 depicts a single HALE unmanned aircraft 710 of a group such as in FIG. 6. The single HALE unmanned aircraft 710 is depicted as including a GPS antenna 711 and GPS receiver 712 for receiving GPS signals from the GPS constellation 750. The single HALE unmanned aircraft 710 is also depicted as including a transceiver 713 for transmitting to the ground repeated GPS signals and/or transmitting to the ground translated GPS signals in an auxiliary frequency band. If the terrestrial GPS receiver 720 may be jammed by a GPS power jammer 760, then the HALE unmanned aircraft 710 may provide a repeater transmission via the GPS frequencies to the terrestrial GPS receiver 720, or may be configured to transmit the repeated information via an auxiliary RF channel, e.g., a Ku band transmission, to a terrestrial RF receiver 730 in cooperation with the GPS receiver 720. By the transmission of four repeated GPS signals in the auxiliary RF channel, the GPS receiver, after translation by the RF receiver 730 processing, may generate a GPS solution.

Precision for surveillance typically depends on accurate location and geometry, and less so on sensor performance. The position accuracy of the HALE aircraft may be determined through an onboard Global Positioning Satellite (GPS) receiver and inertial instrument package, and, if required, star-tracking, where the choice, quantity, and quality of instruments may vary depending on acceptable system signal senescence, and other performance parameters. In addition, once a HALE aircraft position may be determined in relation to presumably current satellite ephemeris data for the target satellite, or for a terrestrial target—terrestrial data obtained by surveilling the area of interest, or by other third-party sources, then collection of data may be performed where signal and the source of the signals being received may be further refined and pin-pointed.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method of satellite sensor interdiction, comprising:
deploying a first high altitude, long endurance (HALE) unmanned aircraft comprising a satellite tracker and a directable electromagnetic (EM) radiation emitter in cooperation with the satellite tracker;
acquiring, by the satellite tracker, a satellite having an onboard EM sensor;
tracking, by the satellite tracker, the acquired satellite;
emitting interdicting EM radiation, by the directable EM radiation emitter, to the tracked satellite;
prior to the step of emitting by the first HALE unmanned aircraft, deploying a second HALE unmanned aircraft comprising a satellite tracker;
signaling by the first HALE unmanned aircraft to the second HALE unmanned aircraft, the location of the tracked satellite;
acquiring, by the satellite tracker of the second HALE unmanned aircraft, the satellite tracked by the first HALE unmanned aircraft; and
tracking, by the satellite tracker of the second HALE unmanned aircraft, the satellite tracked by the first HALE unmanned aircraft.

2. The method of claim 1 further comprising the second HALE unmanned aircraft transmitting, by the second HALE unmanned aircraft, an interdiction assessment to the first HALE unmanned aircraft.

3. The method of claim 1 wherein the second HALE unmanned aircraft further comprises a directable electromagnetic (EM) radiation emitter in cooperation with a satellite tracker of the second HALE unmanned aircraft.

4. The method of claim 3 further comprising: emitting interdicting EM radiation, by the directable EM radiation emitter of the second HALE unmanned aircraft, to the tracked satellite based on an interdiction assessment of at least one of: the first HALE unmanned aircraft and the second HALE unmanned aircraft.

5. The method of claim 1 wherein the directable EM radiation emitter of the first HALE unmanned aircraft is a turret mounted laser.

6. The method of claim 1 wherein the satellite tracker of the first HALE unmanned aircraft comprises a gyroscopically stabilized telescopic platform feeding an electro-optical sensor in communication with a tracking processor.

7. A system for satellite sensor interdiction comprising:
a first high altitude, long endurance HALE unmanned aircraft comprising:
a satellite tracker and a directable electromagnetic (EM) radiation emitter in cooperation with the satellite tracker wherein the satellite tracker is configured to acquire and track a satellite having an onboard EM sensor; and wherein the directable EM radiation emitter is configured to emitting interdicting EM radiation to the EM sensor of the tracked satellite;
a second HALE unmanned aircraft comprising a satellite tracker, wherein the second HALE unmanned aircraft is configured to receive, via signaling by the first HALE unmanned aircraft or via signaling via a ground station, the location of the tracked satellite; wherein the satellite tracker of the second HALE unmanned aircraft is configured to acquire the satellite tracked by the first HALE unmanned aircraft; and wherein the satellite tracker of the second HALE unmanned aircraft is further configured to track the satellite tracked by the first HALE unmanned aircraft.

8. The system of claim 7 wherein the second HALE unmanned aircraft is further configured to transmit an interdiction assessment to the first HALE unmanned aircraft.

9. The system of claim 7 wherein the second HALE unmanned aircraft further comprises a directable electromagnetic (EM) radiation emitter in cooperation with a satellite tracker of the second HALE unmanned aircraft.

10. The system of claim 9 wherein the directable EM radiation emitter of the second HALE unmanned aircraft is further configured to emit interdicting EM radiation to the tracked satellite based on an interdiction assessment of at least one of: the first HALE unmanned aircraft and the second HALE unmanned aircraft.

11. The system of claim 7 wherein the directable EM radiation emitter of the first HALE unmanned aircraft is a turret mounted laser.

12. The system of claim 7 wherein the satellite tracker of the first HALE unmanned aircraft comprises a gyroscopically stabilized telescopic platform feeding an electro-optical sensor in communication with a tracking processor.

* * * * *